US011103958B2

United States Patent
Blázquez-Sanchez

(10) Patent No.: US 11,103,958 B2
(45) Date of Patent: Aug. 31, 2021

(54) IMAGING OPTIC FOR MATERIAL MACHINING BY MEANS OF LASER RADIATION AND LASER MACHINING HEAD HAVING SAME

(71) Applicant: PRECITEC GMBH & CO. KG, Gaggenau (DE)

(72) Inventor: David Blázquez-Sanchez, Gaggenau (DE)

(73) Assignee: PRECITEC GMBH & CO. KG, Gaggenau (DE)

(*) Notice: Subject to any disclaimer, the term of this patent is extended or adjusted under 35 U.S.C. 154(b) by 279 days.

(21) Appl. No.: 16/098,113

(22) PCT Filed: May 3, 2017

(86) PCT No.: PCT/EP2017/060539
§ 371 (c)(1),
(2) Date: Oct. 31, 2018

(87) PCT Pub. No.: WO2017/191191
PCT Pub. Date: Nov. 9, 2017

(65) Prior Publication Data
US 2019/0151997 A1 May 23, 2019

(30) Foreign Application Priority Data
May 4, 2016 (DE) ...................... 10 2016 005 376.3

(51) Int. Cl.
*B23K 26/38* (2014.01)
*B23K 26/046* (2014.01)
(Continued)

(52) U.S. Cl.
CPC ............ *B23K 26/38* (2013.01); *B23K 26/046* (2013.01); *B23K 26/0648* (2013.01);
(Continued)

(58) Field of Classification Search
CPC .. B23K 26/38; B23K 26/046; B23K 26/0665; B23K 26/0648
(Continued)

(56) References Cited

U.S. PATENT DOCUMENTS 4,353,617 A 10/1982 Tokumitsu et al.
8,796,582 B2 * 8/2014 Kawai ................ B23K 26/0884
219/121.63
(Continued)

FOREIGN PATENT DOCUMENTS

CN 2293794 Y 10/1998
CN 102974939 A 3/2013
(Continued)

OTHER PUBLICATIONS

PCT International Search Report, PCT/EP2017/060539, dated Aug. 21, 2017, 4 Pages.
(Continued)

*Primary Examiner* — Thien S Tran
(74) *Attorney, Agent, or Firm* — Fenwick & West LLP

(57) ABSTRACT

The invention pertains to imaging optics (20) for material machining by means of laser irradiation, with said focusing optics comprising collimator optics (21) for collimating the divergent working laser beam (121) and focusing optics (22) for focusing the working laser beam (12) on a workpiece (14) to be machined, wherein the collimating optics (21) comprise a first lens or lens group (211) with positive focal length for focusing a working laser beam source (18) in a virtual intermediate focal point and a second movable lens or lens group (212) with negative focal length for focusing the virtual intermediate focal point to infinity. The invention furthermore proposes a laser machining head (1) with a housing (10), through which a working laser beam (12) can
(Continued)

Figure 1:
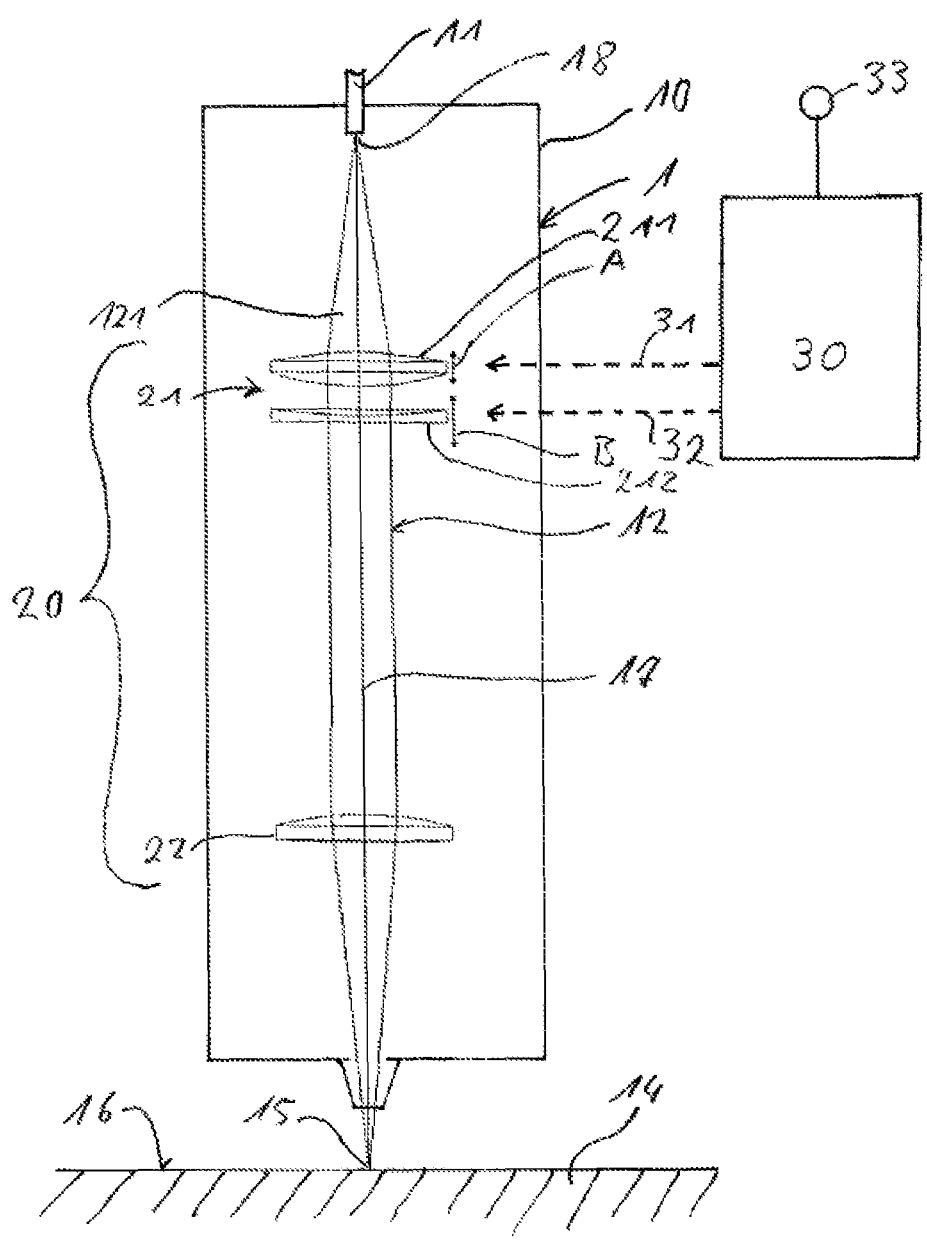

be guided. The inventive imaging optics (20) serve for generating a working focal point (15).

4 Claims, 2 Drawing Sheets

(51) Int. Cl.
  *B23K 26/06* (2014.01)
  *G02B 19/00* (2006.01)
(52) U.S. Cl.
  CPC ...... *B23K 26/0665* (2013.01); *G02B 19/0014* (2013.01); *G02B 19/0047* (2013.01); *G02B 19/0052* (2013.01)
(58) Field of Classification Search
  USPC .......................... 219/121.63, 121.67, 121.73
  See application file for complete search history.

(56) References Cited

U.S. PATENT DOCUMENTS

| | | | |
|---|---|---|---|
| 2003/0227614 | A1 | 12/2003 | Taminiau et al. |
| 2007/0193984 | A1* | 8/2007 | Kawai ................. B23K 26/082 219/121.63 |
| 2008/0267228 | A1* | 10/2008 | Sacks ................ H01S 3/094003 372/6 |
| 2014/0307312 | A1* | 10/2014 | Rupp ................... B23K 26/073 359/432 |

FOREIGN PATENT DOCUMENTS

| | | |
|---|---|---|
| CN | 103633557 A | 3/2014 |
| CN | 104317065 A | 1/2015 |
| DE | 198 25 092 A1 | 12/1999 |
| DE | 10 2008 048502 A1 | 4/2010 |
| DE | 20 2010 006 047 U1 | 8/2010 |
| DE | 10 2011 117607 A1 | 5/2013 |
| DE | 10 2015 108 248 A1 | 12/2016 |
| EP | 0 723 834 A1 | 7/1996 |
| JP | 2003-251475 A | 9/2003 |
| JP | 2006-132018 A | 5/2006 |
| JP | 2010-125510 A | 6/2010 |
| JP | 2013-202675 A | 10/2013 |
| JP | 2014-188518 A | 10/2014 |
| JP | 2015-150567 A | 8/2015 |
| KR | 10-2013-0020892 A | 3/2013 |
| RU | 2420379 C1 | 6/2011 |
| RU | 2556186 C2 | 7/2015 |
| UA | 74855 U | 11/2012 |
| WO | WO 2011/131541 A1 | 10/2011 |
| WO | WO-2011131541 A1 * | 10/2011 ............. B23K 26/14 |
| WO | WO 2016/188803 A1 | 12/2016 |

OTHER PUBLICATIONS

China National Intellectual Property Administration, Office Action, CN Patent Application No. 201780014582.0, dated Oct. 31, 2019, 11 pages.
Korean Intellectual Property Office, Notification of Reason for Refusal, KR Patent Application No. 10-2018-7030801, dated Mar. 12, 2020, eight pages.
Russian Patent & Trademark Office, Official Examination Notice, RU Application No. 2018133020/02(054140), dated Jul. 31, 2019, six pages.

* cited by examiner

IMAGING OPTIC FOR MATERIAL MACHINING BY MEANS OF LASER RADIATION AND LASER MACHINING HEAD HAVING SAME

The invention pertains to imaging optics for material machining by means of laser radiation and to a laser machining head equipped with such beam shaping optics.

In the machining of workpieces by means of laser radiation, it is frequently necessary to adjust the focal position, i.e. the position of the laser beam focal point relative to the laser machining head and/or to the workpiece, as well as the focal diameter. This is necessary, for example, when the machining changes from thin sheet metal to thick sheet metal in a laser cutting system. If the focal diameter cannot be varied over a sufficiently broad range in this case, the machining optics have to be exchanged such that the productivity of the laser machining system is reduced.

An optical system, by means of which the image size, i.e. the focal diameter in material machining by means of laser radiation, can be varied while the object and image positions remain constant, is known in technical optics as a zoom system. For example, zoom systems make it possible to adjust the magnification, i.e. the ratio of the focal diameter to the diameter of the laser light source (e.g. the laser output face of an optical fiber), by utilizing an afocal telescope between the collimating and focusing optics. Such afocal telescopes typically consist of three or four lens groups. Afocal telescopes are described, e.g., in U.S. Pat. No. 4,353,617 A and EP 0 723 834 A. Two motions are usually required for realizing the adjustment of the focal diameter without changing the focal position. In this case, the first motion of a lens or lens group of the zoom system serves for varying the focal diameter whereas the second motion of another lens or lens group of the zoom system serves for compensating the change of the focal position, i.e. for shifting the focal point back into its original position. In industrial material machining by means of laser radiation in the multi-kilowatt range, however, the number of optical elements should be minimized because undesirable effects typically increase with the number of optical elements and amplify one another. One such example is a thermal focal point shift, i.e. the variation of the refractive power or focal length of a lens or an optical system due to the temperature-depended refractive index and/or the thermal expansion of the lens material.

DE 198 25 092 C2 discloses a laser system for generating a focused laser beam with variable focal diameter, wherein a negative (concave) optical element (diverging lens), which can be moved in the direction of the optical axis, is provided between a stationary collimating lens and a focusing lens that can also be moved in the direction of the optical axis. The diameter of the laser beam focal point can be varied by varying the distance between the diverging lens and the focusing lens. In order to ensure that the focal plane remains in the workpiece plane, the system consisting of the diverging lens and the focusing lens has to be correspondingly displaced in the direction of the optical axis of the system.

In this case, it is disadvantageous that a high mechanical effort is required in the focusing section because special requirements with respect to robustness and accessibility apply due to the close vicinity to the machining point and the associated thermal stresses and contamination risks as a result of spatters of molten metal, smoke and the like.

DE 20 2010 006 047 U1 discloses a beam shaping unit for focusing a laser beam, which comprises collimating optics consisting of two converging optical elements that can be moved along the optical axis in the laser machining head, as well as focusing optics. The collimating optics are realized in the form of a Keplerian telescope. In this case, the first movable optical element serves for adjusting the focal diameter and the second movable optical element serves for compensating or adjusting the focal position.

Since a real intermediate focal point exists in the collimating section in this case, the known optical system has a considerable overall length.

DE 10 2011 117 607 A1 discloses another optical system for laser radiation with variable magnification, in which a collimating lens system and focusing optics are provided. The collimating lens system consists of a first movable converging lens group, a second movable diverging lens group and a third stationary or axially movable converging lens group. The focal diameter can once again be adjusted by displacing the first two lens groups relative to one another. It is furthermore possible to adjust the axial focal position if the third lens group can also be axially adjusted.

The movable optical elements also lie in the collimating section in this case, but the usual thermal problems of laser material machining such as, for example, thermal focal point shifts become particularly critical due to the large number of optical elements used.

The invention is based on the objective of making available imaging optics for material machining by means of laser radiation, wherein the imaging optics allow a flexible adjustment of the focal position and the focal diameter with a technically simple and compact design. The invention furthermore aims to make available a laser machining head with such imaging optics.

These objectives are attained with the imaging optics and the laser machining head as disclosed herein. Advantageous embodiments of the invention are also disclosed herein.

In accordance with the invention, there is provided a laser machining head comprising: a housing, through which a working laser beam can be guided, and imaging optics for material machining by means of laser radiation, with the imaging optics comprising collimator optics for collimating the working laser beam and focusing optics for focusing the working laser beam on a workpiece to be machined, wherein the collimating optics comprise a first movable lens or lens group with positive focal length for focusing a working laser beam source in a virtual intermediate focal point and a second movable lens or lens group with negative focal length for focusing the virtual intermediate focal point to infinity.

The invention concerns imaging optics for laser radiation with adjustable focal position, as well as adjustable focal diameter. In this case, a zoom system comprises collimating optics consisting of a first movable lens or lens group with a positive focal length and a second movable lens or lens group with negative focal length, as well as a focusing element. The first movable lens or lens group with positive focal length serves for focusing a working laser beam source in a virtual intermediate focal point and the second movable lens or lens group with negative focal length serves for focusing the virtual intermediate focal point to infinity such that the focusing optics focus the working laser beam source in its focal point.

Furthermore, a laser machining head with a housing, through which a working laser beam can be guided, is equipped with the inventive imaging optics in order to generate a working focal point.

According to the invention, a maximum adjustment range of the focal position can thereby be achieved with a reduced number of optical elements or lens groups and a minimum structural length.

According to an advantageous enhancement of the inventive laser machining head, it is proposed that the first movable lens or lens group and the second movable lens or lens group can be respectively displaced by an actuating drive in order to adjust the focal diameter and/or the focal position.

It would basically be conceivable to couple both actuating drives to one another by means of gear mechanisms such that the displacements of the lenses or lens groups take place synchronous and/or proportional to one another. However, an advantageous embodiment of the invention is characterized in that the actuating drives operate independently of one another. This not only has the advantage of allowing a simple mechanical design, but also makes it possible to easily take into account the wavelength dependence of the focal lengths of the optical elements in the adjustment of the focal diameter and/or the focal position when the working laser radiation is changed.

The position of the movable lenses or lens groups relative to one another and relative to the focusing optics is adjusted in dependence on the type of machining and the laser wavelength by means of a control unit, which is preferably programmable.

Figure 2:
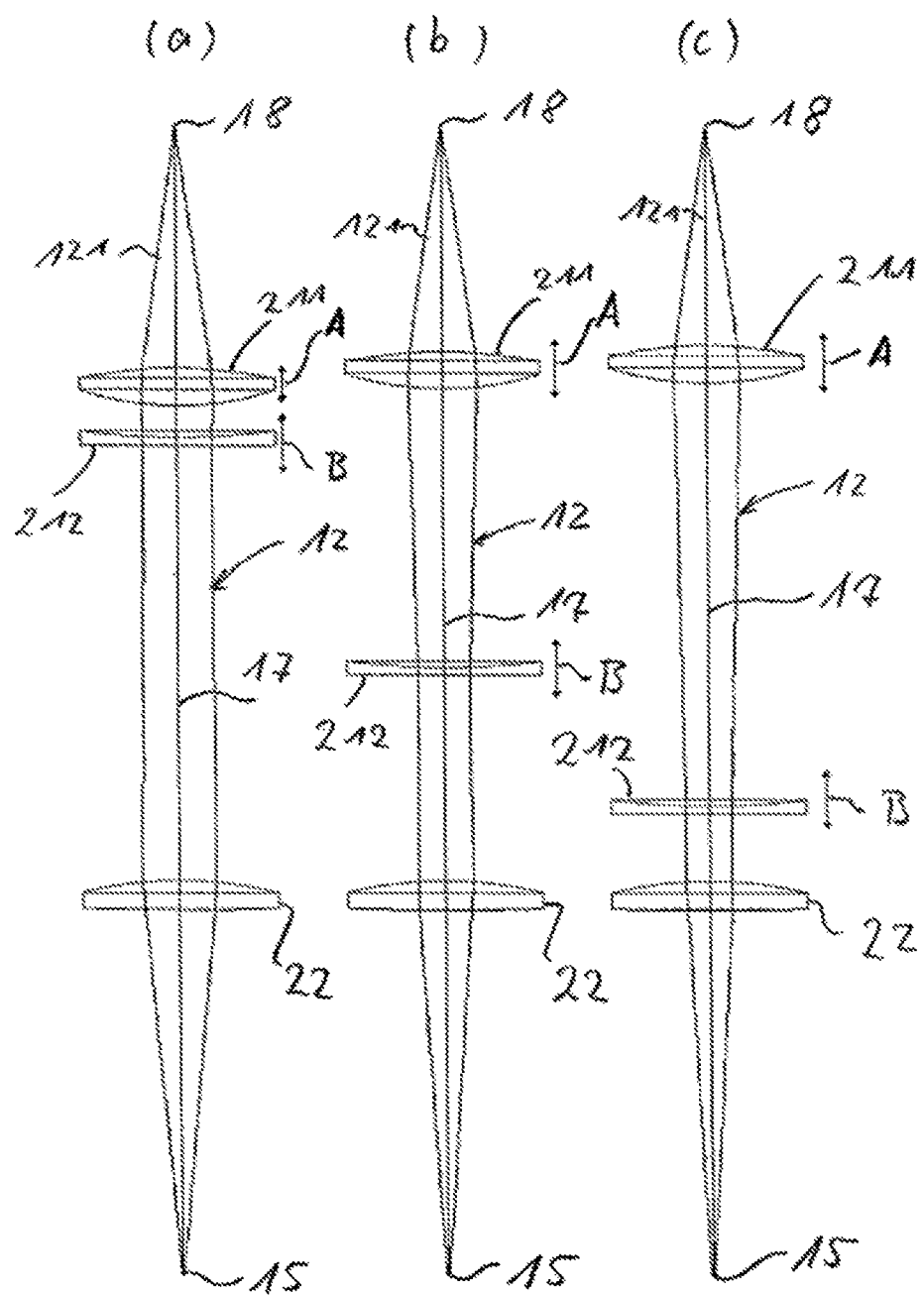

Examples of the invention are described in greater detail below with reference to the drawings. In these drawings:

FIG. 1 shows a simplified schematic representation of an inventive laser machining head, and FIGS. 2 (a) to (c) show simplified schematic representations of the inventive imaging optics, in which the lens groups assume different positions relative to one another. Identical components are identified by the same reference symbols in the figures.

FIG. 1 shows a laser machining head 10, through which a working laser beam 12 supplied via an optical fiber 11 is guided and directed at a workpiece 14. The divergent working laser beam 121 being output by the optical fiber 11 is focused in a working focal point 15 on, above or underneath a surface 16 of the workpiece 14 by means of imaging optics 20.

The imaging optics 20 comprise collimating optics 21 and focusing optics 22. The collimating optics 21 consist of a first movable lens or lens group 211 with positive focal length and a second movable lens or lens group 212 with negative focal length. The first and second movable lenses or lens groups 211, 212 respectively can be axially displaced along the optical axis 17 by means of respective actuating drives A, B as indicated with corresponding arrows in order to thereby adjust the focal diameter and/or focal position.

The actuating drives A, B, which operate independently of one another, are controlled by a control unit 30 as indicated with broken lines 31, 32 such that the position of the movable lenses or lens groups 211, 212 relative to one another and relative to the focusing optics 22 can be adjusted in dependence on the laser wavelength and the type of machining.

The control unit 30, which can be advantageously programmed by means of a suitable wireless or wired-bound interface 33, may be integrated into a machine control of a laser machining system, in which the inventive laser machining head 1 is used, but this integration is not illustrated in greater detail in the figures. In this way, all information on the laser wavelength, the type of machining such as laser cutting or laser welding, the type of material such as metal or plastic, the sheet metal thickness and the like, which is required for the adjustment of the lenses or lens groups 211, 212, can be easily made available to the control unit 30.

FIGS. 2 (a) to (c) respectively show the positions of the movable lens groups 211, 212 relative to one another, relative to the focusing optics 22 and relative to a working laser beam source 18, which may be formed by the output face of an optical fiber 11, namely the positions suitable for cutting thin sheet metal with a thickness of about 5 mm or less, medium sheet metal with a thickness of about 5 mm to about 10 mm and thick sheet metal with a thickness of more than about 10 mm.

FIG. 2 (a) shows an example of the position of the first and the second movable lenses or lens groups 211, 212 of the collimating optics 21 for cutting thin sheet metal, wherein the working laser beam 12 may have a relatively small diameter and a relatively short Rayleigh length in the region of the focal point 15. Small focal point diameters of about 100 μm to 150 μm are conventionally used for thin sheet metal.

If the focusing properties of a lens system are taken into account in accordance with the equation $$m=NA/NA',$$

in which m represents the magnification, NA represents the numerical aperture of the system on the object side and NA' represents the numerical aperture of the system on the image side, a magnification of =~1 results in the exemplary embodiment according to FIG. 2a, in which the numerical aperture on the image side NA' is approximately identical to the numerical aperture on the object side NA. The optimal focal point diameter for cutting thin sheet metal is therefore achieved with a fiber diameter of about 100 μm.

If the beam diameter should be reduced, the first movable lens group 211 with positive focal length is moved closer to the working laser beam source 18 such that the image of the working laser beam source 18 generated by the first movable lens group moves away from the first movable lens group 211. In order to compensate the focal position, the second movable lens group 212 with negative focal length therefore has to be displaced until the image of the working laser beam source 18 is located in the focal point of the second movable lens group 212 with negative focal length such that it is focused to infinity by this second movable lens group 212. Consequently, the laser focal point 15 once again lies in the focal point of the focusing optics 22.

In order to obtain a particularly long Rayleigh length at a large focal diameter as it would be desirable for cutting thick sheet metal, the first movable lens assembly 211 illustrated in FIG. 2 (c) is moved even closer to the working laser beam source whereas the second movable lens assembly 212 has to be moved even closer to the focusing optics 22. FIG. 2 (c) particularly shows that the numerical aperture on the image side NA' is smaller than the numerical aperture on the object side NA such that the resulting magnification is m>1.

The significant advantage of the inventive imaging optics 20 can be seen in that they also allow a broadened readjustment range for the focal position in addition to the simple and flexible adjustment of the focal position and the focal diameter. The adjustment range for the focal positions without an adjustment of the focusing optics 22 can particularly be maximized because the focal diameter and the focal position are adjusted by means of the movable lens groups 211, 212 in the collimating section and not with optical elements of the focusing section. In this context, the invention particularly utilizes the fact that changes of the focal position are linear with the position changes of the focusing optics 22 whereas changes of the focal position are squared in relation to changes of an optical component in the collimating section. Accordingly, small displacements of the movable lens groups 211, 212 in the collimating section already result in considerable displacements of the focal position.

Another advantage of the inventive imaging optics can be seen in that the use of collimating optics 21, which according to the invention are designed in the form of a Galilean telescope, allows a short structural length of the imaging optics 20 without real intermediate focal point.

All this is achieved with a total of only three lens groups, wherein two lens groups are arranged in the collimating section and one lens group is arranged in the focusing section, and wherein only the first two lens groups are movable. In this way, the optical zoom system of the inventive imaging optics has a very simple technical design and is at the same time unsusceptible to thermal focal point shifts.

The invention claimed is:

1. A laser machining head comprising:
a housing, through which a working laser beam is guided, and
imaging optics for material machining by means of laser radiation, with said imaging optics comprising collimator optics for collimating the working laser beam and focusing optics for focusing the working laser beam on a workpiece to be machined,
wherein the collimating optics comprise a first movable lens or lens group with positive focal length for focusing a working laser beam source in a virtual intermediate focal point and a second movable lens or lens group with negative focal length for focusing the virtual intermediate focal point to infinity,
wherein the first movable lens or lens group and the second movable lens or lens group are displaceable by respective actuating drives in order to adjust a focal diameter and a focal position of the working laser beam, and
wherein the actuating drives is operated independently of one another such that a position of the first and second movable lenses or lens groups relative to one another and relative to the focusing optics is adjusted.

2. The laser machining head according to claim 1, wherein the working laser beam is supplied via an optical fiber with a fiber diameter of 100 μm.

3. The laser machining head according to claim 1, wherein a position of the first and second movable lenses or lens groups is adjusted in dependence on a type of machining and a laser wavelength by means of a control unit.

4. The laser machining head according to claim 3, wherein the control unit is programmable.

* * * * *